United States Patent [19]

Mock

[11] 3,853,001
[45] Dec. 10, 1974

[54] CRANE LOAD MEASURING MEANS

[75] Inventor: Thomas M. Mock, Tacoma, Wash.

[73] Assignee: American Hoist & Derrick Company, Saint Paul, Minn.

[22] Filed: June 7, 1973

[21] Appl. No.: 367,706

Related U.S. Application Data

[63] Continuation-in-part of Ser. No. 271,413, July 13, 1972, abandoned.

[52] U.S. Cl. .............. 73/133 R, 73/88.5 R, 212/2, 340/267 C
[51] Int. Cl. .............................................. G01l 5/00
[58] Field of Search ............ 73/88.5 R, 141 A, 143, 73/133 R; 177/139, 147; 340/267 C; 212/2, 39 R, 39 MS

[56] References Cited
UNITED STATES PATENTS

| | | | |
|---|---|---|---|
| 2,551,178 | 5/1951 | Southerland | 73/141 R X |
| 2,873,341 | 2/1959 | Kutsay | 73/141 A UX |
| 3,278,925 | 10/1966 | Saunders et al. | 340/267 C |
| 3,338,091 | 8/1967 | Tatum | 73/88.5 R |
| 3,534,355 | 10/1970 | Fathauer | 340/267 C |
| 3,554,025 | 1/1971 | Andersson et al. | 73/141 A |
| 3,695,096 | 10/1972 | Kutsay | 73/88.5 R |
| 3,754,610 | 8/1973 | Paelian et al. | 177/211 |

*Primary Examiner*—Charles A. Ruehl

[57] ABSTRACT

Means for measuring the force tending to overturn a crane and immediately indicating the measurement to the operator on a single gauge irrespective of the angle of the boom. The particular device includes a pair of transducers or strain gauges mounted within the hinge pin and measure the force generated by the load. The transducers may selectively be placed to measure the horizontal component of force or the component of force along a line perpendicular to a line between the hinge pin and the gantry pin.

4 Claims, 5 Drawing Figures

PATENTED DEC 10 1974　3,853,001
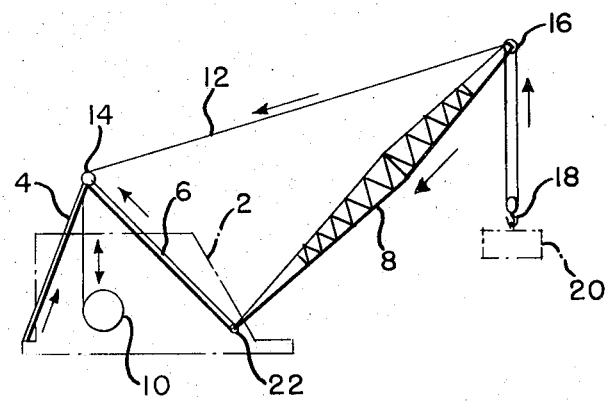
FIG. 1
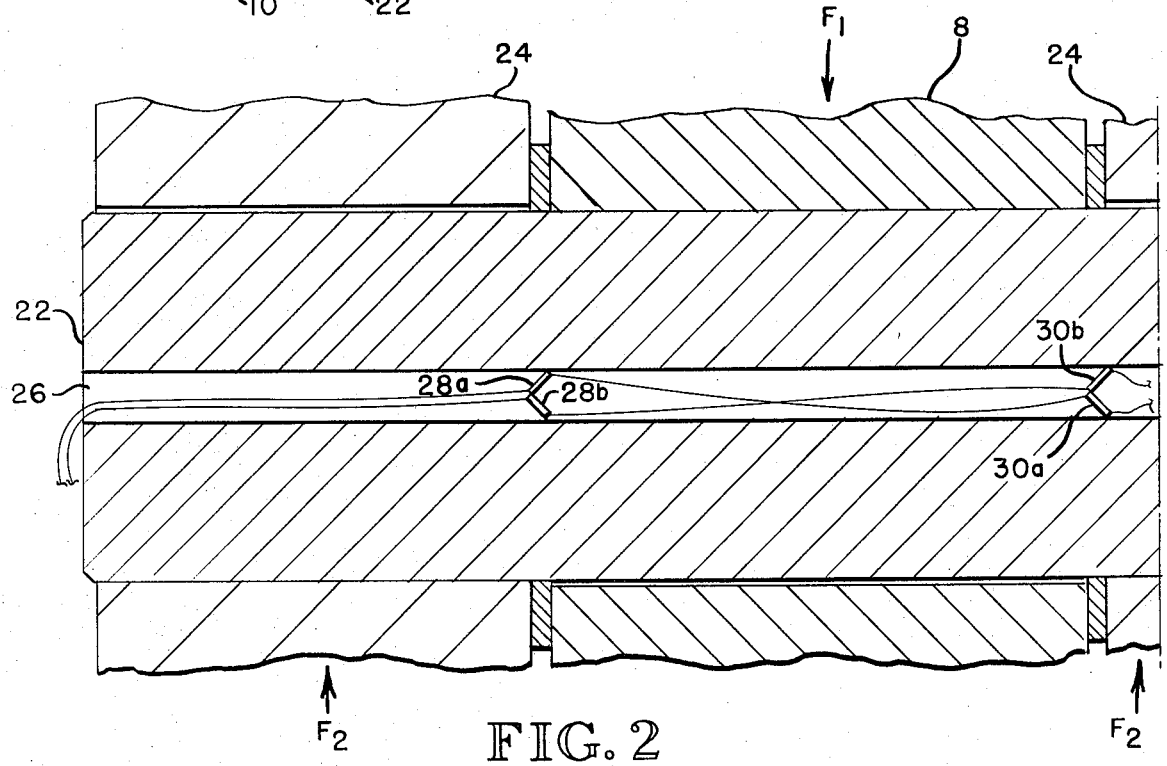
FIG. 2
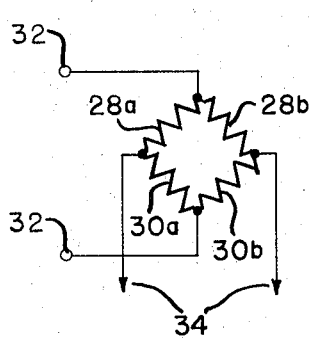
FIG. 3
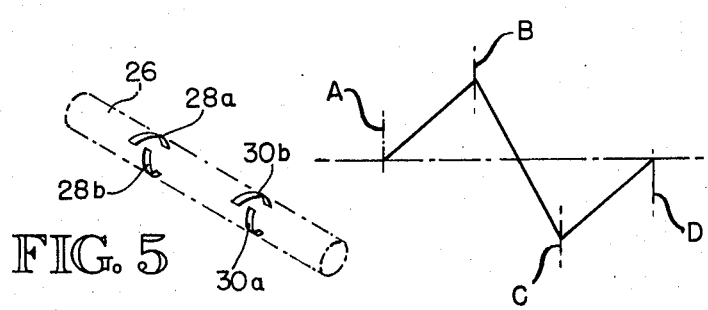
FIG. 5
FIG. 4

CRANE LOAD MEASURING MEANS

BACKGROUND OF THE INVENTION

This application is a continuation-in-part of U.S. Pat. application Ser. No. 271,413 filed July 13, 1972, now abandoned.

One of the problems that has plagued crane owners and operators is the inability to accurately determine the maximum weight which may be safely lifted by the crane. The maximum allowable weight depends not only upon the strength of the material of which the crane is fabricated, but also upon the position of the boom, since the more horizontal the boom, the greater turning moment a given load will generate.

In general, the turnover moment is the critical force upon a crane. For the most part, cranes, if used in accordance with the manufacturer's recommendations, are fabricated of structural elements which have a safety factor whereby structural failure is extremely unlikely. One notable exception to the criticality of turnover as opposed to structural failure exists in cranes using outrigger stabilizing elements or when the boom is moved to a vertical placement. In the case of cranes using outriggers or at extreme positions of the boom, structural failure may occur before turnover and for this situation a slight modification of the readout gauge to reflect the strength limitation upon the weakest element is required.

Prior art devices have used load cells to measure the weight of the loads handled by cranes, derricks and the like. These prior art load cells have been installed in the boom or in the cable system in many different forms of installation. For example, load cells may be installed in a length of cable running from the top sheave to the load lifting device. Alternatively, the load cells may be installed on the sheave block itself, such as taught by U.S. Pat. No. 3,290,931 granted to Fowkes et al. on Dec. 13, 1966. Another approach has been to mount the load cell in various cable arrangements at locations removed from the end of the boom. The object of all of these installations is to achieve an accurate measure of stress on the load cell that is then transmitted to a readout device, the combination of which forms a crane scale.

A device recently placed on the market includes a combination of strain gauges which form a part which may replace a coupling member such as a bolt or a pin. This device is specifically described in U.S. Pat. No. 3,695,096 granted to Kutsay on Oct. 3, 1972.

These known load cell installations have several limitations. When the load cell is mounted in the cable directly above the lifting device, which may well be a magnet, the load cell is usually able to read the weight lifted by the lifting device. However, in this installation, the load cell is subjected to considerable shock and strain that is transmitted from the lifting device. To obtain an installation which has less shock on a load cell, the load cell is sometimes placed on the sheave block itself. In the sheave block installation, it is difficult to allow for side forces that contribute to an inaccurate weight reading. In still other installations the load cell may be placed in a combination cable and sheave installation that is out of the direct cable support between the sheave block and lifting device. In the latter installation the load cell responds to a load that is different from that actually lifted and the load cell reading must then be adjusted to determine the actual weight lifted, a calibration which must be performed each time the crane is moved.

One of the basic difficulties with these approaches is the calibration necessary to determine the weight accurately when under normal circumstances the actual weight lifted is not the critical factor. What must be determined is whether or not the moment generated by the force exerted during lifting is close to or beyond that point which will turn the crane over. In order to determine whether or not the load being lifted is within the limits such that the crane will not overturn, the combined measurement of the actual load as well as the placement of the boom must be determined. Once these values are determined, a calculation must be made, based upon both factors, to determin the needed moment. The calculation may be done automatically by computer, an expensive device, or by the operator. It is not desirable to have a device such as a calculator in a machine because of both the adverse conditions and the additional expense. To expect an operator to make the necessary calculation, either by a manual means or even through a comparative reading of gauges, will obviously slow the operation of the machine or cause a distraction of attention which could be dangerous.

Since a crane is normally used under extremely adverse conditions whereat it is exposed to both weather and contamination, the means used for determining the maximum weight allowable must be not only of simple construction but further must be fairly rugged and completely sheltered from the elements. All of the hereinabove prior art methods suffer from one or more drawbacks based upon the most desirable installation as noted above. Prior art means for measuring loads wherein the load measuring device is substantially shielded are taught by the two patents, U.S. Pat. No. 3,499,500 to Harding, Mar. 10, 1970, and 3,620,074 granted to Laimins et al. on Nov. 16, 1971, both of which place transducers within the axle of an airplane or the like to measure bending stresses on the axle. The bending stress upon the axle is indicative of the relative weight carried by the various wheels.

Another approach for measuring the load on the shaft is taught by Habern et al. in U.S. Pat. No. 3,330,154, July 11, 1967, wherein the deformation of the hollow end of an axle is measured to determine the amount of strain on the cable wrapped upon a drum supported by the axle.

Still another approach is disclosed in U.S. Pat. No. 3,695,096, noted above, which may be utilized where there is need for a rugged, accurate means for measuring load in a variety of situations.

With the above noted prior art and problems in mind,

It is an object of the present invention to provide a means and method for measuring the strain upon a crane by means of measuring the horizontal force placed upon the hinge pin of the crane and thereby determining the turning moment which would cause turnover.

It is another object of the present invention to measure the moment generated by a load upon a crane which is an indication of the forces tending to cause crane turnover irrespective of the position of the boom relative to the horizontal plane.

It is still another object of the present invention to provide a gauge means which is inserted into the hinge pin of the crane wherein the gauge measures the horizontal component of the force, thereby enabling a determination of the turning moment.

Still another object of the present invention is to provide means for measuring the turning moment generated upon a crane. Because the measurement is done at the hinge pin, there is no need to accurately know the angular position of boom nor the extent to which the boom is extended. All weight outboard of the pin is reflected in the moment tending to tip the crane.

Yet another object of the present invention is to determine the turnover moment of a crane by measuring the component of force at the hinge pin along a line perpendicular to the line between the hinge pin and the gantry pin, a measurement which closely approximates the resultant moment tending to overturn the crane.

BRIEF DESCRIPTION OF THE DRAWINGS

FIG. 1 is an environmental view showing schematically the various elements of a crane to which the subject measuring device may be attached.

FIG. 2 is an enlarged sectional view of the hinge pin depicting the location of the boom supporting members and the sensing elements as mounted to a removable core piece.

FIG. 3 is a wiring diagram of the transducer elements.

FIG. 4 is a graphical representation of the shear generated during a loaded condition of the crane.

FIG. 5 is a perspective view of the core carrying sensing members.

DETAILED DESCRIPTION OF THE DRAWINGS

As can be seen in FIG. 1, the crane comprises a cab 2, a backstay 4, a forestay 6, boom 8, cable drum 10 and a cable 12 which extends over sheave 16 located at the outer end of the boom before descending vertically to a hook 18 which supports a load 20. The boom 8 is secured to the framework which supports the cab 2 by means of the hinge pin 22 which is the focal point for the present invention.

Referring now to FIG. 2, it can be seen that the hinge pin 22 is mounted between a pair of upstanding trunnions 24 and supports the boom 8 such that when a weight is carried by the boom, the forces generated are in the direction of the arrows shown in FIG. 1. A downward force F1 is generated upon the boom itself which is counteracted by upward forces F2 upon the trunnions.

The hinge pin 22 is bored with an approximately 5/16 inch axial hole. The effect on the strength of a 2-½ to 4 inch hinge pin by a bore of this dimension is fairly minimal. In the event that the hinge is to be subjected to undue stress the steel of the hinge pin may be improved, thus assuring that there will be no mechanical failure.

The hole which has been bored in the hinge pin is then filled by a core member 26. Core member 26 may be fabricated of a soft metal or alternatively a suitable plastic. The core member 26, which is inserted into the hinge pin, is designed to fill the bore as completely as possible and has mounted thereon on opposite sides of the core transducers 28a and 28b placed at an angle to each other and bridging the interface between the trunnions 24 and the bottom portion 8 of the boom. Transducers 30a and 30b are also mounted upon opposite sides of the core member 26 at an angle to each other and at an angle to the axis of the core. Transducers 30a and 30b bridge the interface between the trunnions 24 and the bottom portion of the boom 8 but are placed at the opposite end of the core member 26. The transducers are so placed that they regulate a current by the strain built up by the horizontal component of the turning moment created by a load upon the boom.

The transducers are mounted at an angle to the horizontal axis of the hinge pin and as seen in FIG. 2 the interconnecting wires are crossed such that the bending moment is self-cancelling and the only effect it has had upon the transducers is that of a shear along a predetermined plane, both because of the placement of the transducers as well as the self-cancelling feature noted above.

Referring to FIG. 3, which is a schematic of a balancing bridge, it can be seen that the power source or input is connected to terminals 32 and the gauge wires 28a and 28b, which comprise the transducer 28, are placed at angles upon the core and are connected to transducer gauge wires 30a and 30b which comprise transducer 30.

Referring now back to FIG. 2, it can be seen that the transducers are separated and the interconnection is such that one set is rotated through 180° before they are placed, bridging the two respective interfaces between the boom and the trunnions such that any bending moment is self-cancelling within the hinge pin and the only force that is measured is the shear component along a predetermined plane which becomes an additive factor between the two sets of transducers. The two output lines 34 transmit an electrical signal, generated by the shear stresses developed and measured by the gauge wires, to a suitable readout 35 which would normally indicate no more than a red line or danger area. Using this instrument, the operator of the crane knows that he has exceeded the turnover limit of his particular crane at the particular angle of the boom. It is to be understood that with necessary calibration and proper indication of the length of angle of the boom, this arrangement could well be used to determine actual weight.

FIG. 4 is a schematic shear diagram such as would be typical of the stresses hereinabove contemplated. Points A and D represent the outer ends of the hinge pin 22 and points B and C indicate the interface between the trunnions 24 and the boom 8. It is understood that there would be slight spacing between the trunnions 24 and the boom 8 such that the indication given in FIG. 4 is not completely accurate, but with relationship to the relative size of the trunnions and boom, the spacing therebetween is not so great as to be critical.

FIG. 5 is an isometric of the core member itself and more clearly shows the relationship of the transducers to the core member. It is to be understood that although the preferred embodiment is shown in the hinge pin of a crane, the shear measuring concept can equally well be applied to any situation where a force is supported by a pin securing two opposingly stressed elements.

As stated above, the present invention is designed to measure the force tending to overturn a crane. It is desirable to use a measurement which minimizes the effect of exterior forces or alternatively is so located to cancel or not measure those forces which would tend to distort the data. When this sensor, as described hereinabove, is placed in the heel pin of the gantry crane such that it measures only the horizontal component of shear, the relationship between its value and the turning moment is essentially constant over a major portion of the useful range of the crane. It has been discovered, however, that if accuracy is necessary over a large portion of the range, a measurement of the component of shear along a line perpendicular to the line between the heel pin and the gantry pin provides this additional accuracy. The relationship between the two values is such that the readout gauge may be simply calibrated to read the turning moment and thus the value of interest may be read directly.

Thus it can be seen that through the use of this core-mounted transducer the operator has a ready indication of when he is approaching the weight limits of his crane. This indication will have no relation to specific configuration or boom length. The calibration of the gauge which will give a readout to the operator is extremely simple. The transducer is placed within the hinge pin and crane secured to a relatively fixed object and sufficient stress is placed upon the crane until it approaches a turnover condition. At this point the red line or warning indicator can be placed upon the readout gauge and the approach of an indicating needle to this point will be an immediate readout for the operator of inherent danger. The placement of the transducers within the hinge pin assures maximum protection from contamination and damage, assuring a long lived accurate safety feature.

The embodiments of the invention in which a particular property or privilege is claimed are defined as follows:

1. In a crane system having a boom pivotably mounted about a horizontal axis to a main frame, a back stay for stabilizing the boom and having a relatively fixed force to counteract any moment generated by a load carried by the boom tending to overturn the crane means for detecting an overturn condition, comprising:

horizontally disposed hinge pin means interconnecting the boom and the framework, core means secured within the hinge pin and transducer means carried by the core means in the pin between the frame and the boom to respond to the single component of a moment tending to overturn as reflected in the force at the hinge pin to the exclusion of essentially all other forces, whereby the overturn moment is accurately reflected irrespective of the angle of the boom or the actual weight being lifted, relieving the operator from making a plurality of measurements or comparisons.

2. Means as in claim 1 wherein the component measured is the horizontal component of shear.

3. Means as in claim 1 wherein the component measured is along a line perpendicular to a line extending from the hinge pin and to extremity of the back stay.

4. A method of detecting an overturn condition in a crane having a boom mounted upon a hinge pin and a support secured to a gantry pin comprising the step of:

measuring the components of force at the hinge pin along a direction perpendicular to a line passing between the hinge pin and the gantry pin, said component approximating the curve of the turnover moment whereby only one measurement need be considered and the value displayed for operator readout independent of the boom angle.

* * * * *